(12) United States Patent
Tan et al.

(10) Patent No.: US 11,953,153 B2
(45) Date of Patent: Apr. 9, 2024

(54) HIGH-PRESSURE GAS CYLINDER VALVE FOR VEHICLE

(71) Applicant: YAPP AUTOMOTIVE PARTS (KAIFENG) CO., LTD., Henan (CN)

(72) Inventors: Guanghui Tan, Henan (CN); Lin Jiang, Henan (CN); Shaowen Hu, Henan (CN); Yinchun Liu, Henan (CN); Xiaoqiong Dong, Henan (CN); Kaige He, Henan (CN)

(73) Assignee: YAPP AUTOMOTIVE PARTS (KAIFENG) CO., LTD., Henan (CN)

( * ) Notice: Subject to any disclaimer, the term of this patent is extended or adjusted under 35 U.S.C. 154(b) by 57 days.

(21) Appl. No.: 17/780,996

(22) PCT Filed: Dec. 28, 2021

(86) PCT No.: PCT/CN2021/142116
§ 371 (c)(1),
(2) Date: May 30, 2022

(87) PCT Pub. No.: WO2023/279679
PCT Pub. Date: Jan. 12, 2023

(65) Prior Publication Data
US 2023/0134483 A1    May 4, 2023

(30) Foreign Application Priority Data
Jul. 8, 2021 (CN) .......................... 202110773660.3

(51) Int. Cl.
*F17C 13/04* (2006.01)
*F16K 11/10* (2006.01)
(Continued)

(52) U.S. Cl.
CPC ............ *F17C 13/04* (2013.01); *F16K 11/105* (2013.01); *F16K 15/184* (2021.08);
(Continued)

(58) Field of Classification Search
CPC .......... H01M 8/04201; H01M 8/04761; F16K 11/105; F16K 15/184; F17C 13/04
See application file for complete search history.

(56) References Cited

U.S. PATENT DOCUMENTS

| 5,232,019 A | * | 8/1993 | Wolff | ...................... F17C 13/04 141/95 |
| 5,309,945 A | * | 5/1994 | Sakai | ...................... F17C 13/04 137/861 |

(Continued)

FOREIGN PATENT DOCUMENTS

| CN | 101140051 | 3/2008 |
| CN | 104321575 | 1/2015 |

(Continued)

OTHER PUBLICATIONS

"International Search Report (Form PCT/ISA/210) of PCT/CN2021/142116", dated Apr. 8, 2022, pp. 1-6.

(Continued)

*Primary Examiner* — Jessica Cahill
(74) *Attorney, Agent, or Firm* — JCIPRNET

(57) ABSTRACT

A high-pressure gas cylinder valve for vehicle includes a valve seat having a gas charging runner and a gas supplying runner. A check valve is connected in series onto the gas charging runner, and the check valve and a solenoid valve are connected in series sequentially onto the gas supplying runner in a gas flow direction. A portion of the gas supplying runner located downstream of the solenoid valve is jointly connected to a portion of the gas charging runner adjacent to a gas inlet end and supplies gas to outside through a gas inlet of the gas charging runner when the gas supplying runner supplies gas. The gas cylinder valve further includes a flow-blocking buffer structure connected in series onto the gas supplying runner and located downstream of the sole- (Continued)

noid valve and upstream of an intersection of the gas supplying runner and the gas charging runner.

11 Claims, 6 Drawing Sheets

(51) Int. Cl.
    *F16K 15/18* (2006.01)
    *H01M 8/04082* (2016.01)
    *H01M 8/04746* (2016.01)

(52) U.S. Cl.
    CPC ... *H01M 8/04201* (2013.01); *H01M 8/04761* (2013.01); *F17C 2201/0104* (2013.01); *F17C 2205/0332* (2013.01); *F17C 2205/0335* (2013.01); *F17C 2205/0341* (2013.01); *F17C 2221/012* (2013.01); *F17C 2270/0178* (2013.01); *F17C 2270/0184* (2013.01); *H01M 2250/20* (2013.01)

(56) References Cited

U.S. PATENT DOCUMENTS

| | | | | |
|---|---|---|---|---|
| 5,452,738 A | * | 9/1995 | Borland | F16K 31/0655 137/613 |
| 6,202,688 B1 | * | 3/2001 | Khadim | F16K 39/024 137/599.08 |
| 7,951,225 B2 | * | 5/2011 | Olander | F17C 11/00 95/136 |
| 9,644,793 B2 | * | 5/2017 | Lee | F17C 13/04 |
| 10,260,681 B2 | * | 4/2019 | Hanada | F17C 13/04 |
| 2007/0056643 A1 | | 3/2007 | Larsen et al. | |
| 2019/0170260 A1 | * | 6/2019 | Hausmann | F17C 13/04 |

FOREIGN PATENT DOCUMENTS

| | | |
|---|---|---|
| CN | 106356544 | 1/2017 |
| CN | 206682593 | 11/2017 |
| CN | 206816915 | 12/2017 |
| CN | 108224084 | 6/2018 |
| CN | 108278395 | 7/2018 |
| CN | 109416152 | 3/2019 |
| CN | 109812693 | 5/2019 |
| CN | 212298549 | 1/2021 |
| CN | 113503467 | 10/2021 |
| EP | 3495714 | 6/2019 |
| JP | 2005291434 | 10/2005 |
| JP | 2010156443 | 7/2010 |

OTHER PUBLICATIONS

"Written Opinion of the International Searching Authority (Form PCT/ISA/237) of PCT/CN2021/142116", dated Apr. 8, 2022, pp. 1-6.

"Search Report of China Counterpart Application", dated Jun. 23, 2022, p. 1-p. 3.

* cited by examiner

HIGH-PRESSURE GAS CYLINDER VALVE FOR VEHICLE

CROSS-REFERENCE TO RELATED APPLICATION

This application is a 371 of international application of PCT application serial no. PCT/CN2021/142116 filed on Dec. 28, 2021 which claims the priority benefit of China application no. 202110773660.3, filed on Jul. 8, 2021. The entirety of each of the above mentioned patent applications is hereby incorporated by reference herein and made a part of this specification.

BACKGROUND

Technical Field

The disclosure relates to the field of valves, and in particular, relates to a high-pressure gas cylinder valve for vehicle.

Description of Related Art

In order to better achieve energy saving and emission reduction, conventional energy is gradually transformed into green energy. As a development trend, the research and promotion of hydrogen fuel cells have received increasing attention, especially the application of hydrogen fuel cells in the field of vehicles. Regarding the application of hydrogen fuel cells to vehicles, the storage and supply of hydrogen is also a key technology branch. At present, most hydrogen supply systems often include hydrogen gas cylinders and hydrogen supply pipelines connected to fuel cells. The cylinder opening of the hydrogen gas cylinder is equipped with a high-pressure gas cylinder valve for vehicle. The high-pressure gas cylinder valve for vehicle adds hydrogen to the gas cylinder on the one hand, and releases hydrogen to the hydrogen supply pipeline on the other hand. Because vehicles are often required to face the requirements such as light weight, long battery life, and reliable safety, the structural design of high-pressure gas cylinder valve for vehicle also faces various requirements.

The Chinese patent application with the publication No. CN109416152A discloses a gas cylinder valve, and the main application scenario is hydrogen with a rated working pressure of 70 MPa. The gas cylinder valve is also installed on the cylinder opening of the gas storage cylinder and is used to control the in and out of the gas. However, when the vehicle is in the gas charging process, a high-speed gas flow in the gas cylinder valve with an instantaneous gas pressure as high as 90 MPa enters the interior of the solenoid valve. As such, the moving iron core, valve port, and sleeve inside the solenoid valve collide with one another at high speed. The internal structure of the solenoid valve and the valve port are both damaged, the solenoid valve may not work normally as a result, and the overall service life of the high-pressure gas cylinder valve for vehicle is considerably affected.

SUMMARY

The disclosure provides a high-pressure gas cylinder valve for vehicle through which a solenoid valve is prevented from being damaged when being impacted by the vehicle high-pressure gas cylinder during gas charging, and service life and safety of the high-pressure gas cylinder valve for vehicle is prolonged and improved.

A high-pressure gas cylinder valve for vehicle of the disclosure includes:

A valve seat, the valve seat is provided with a gas charging runner and a gas supplying runner.

A check valve is connected in series onto the gas charging runner, and a solenoid valve is connected in series onto the gas supplying runner in a gas flow direction.

A portion of the gas supplying runner, located downstream of the solenoid valve, is jointly connected to a portion of the gas charging runner adjacent to a gas inlet end and supplies gas to the outside through a gas inlet of the gas charging runner when the gas supplying runner supplies gas.

The valve seat is further provided with a wire harness connector configured to be externally connected to the solenoid valve.

The high-pressure gas cylinder valve for vehicle further includes a flow-blocking buffer structure, and the flow-blocking buffer structure is connected in series onto the gas supplying runner, and is located downstream of the solenoid valve and upstream of an intersection of the gas supplying runner and the gas charging runner.

Lots of Experimental researches and practical applications shown that when a high-pressure gas cylinder valve for vehicle currently available on the market is charged, when the high-pressure gas flows from the gas charging runner into the cylinder, the high-pressure gas also enters the gas supplying runner. The high-pressure gas may considerably impact the valve core, valve port, sleeve, and other parts of the solenoid valve, and the solenoid valve may thus be easily damaged. However, in the disclosure, the high-pressure gas cylinder valve for vehicle is provided with a flow-blocking buffer structure connected in series to the gas supplying runner. In this way, when the gas is charged into the gas cylinder through the gas charging runner, the high-pressure gas flowing into the gas supplying runner is blocked by the flow-blocking buffer structure, so that the solenoid valve is prevented from being impacted by the high-pressure gas. Therefore, the solenoid valve is prevented from being damaged, and the reliability and safety of the high-pressure gas cylinder valve for vehicle are guaranteed.

Further, the flow-blocking buffer structure is a flow limiting valve. The flow limiting valve has a simple structure and provides fast response. That is, when high-pressure gas flows through, the flow limiting valve may respond quickly and turn off the gas pipelines, such that the solenoid valve is protected. The flow limiting valve normally is turned on, and will be turned off instantaneously only when a high-speed gas flow is generated during the gas filling process, and automatically resets after the gas filling is completed. Therefore, when the hydrogen gas is supplied to the outside through the solenoid valve, it is at the maximum turning-on position so that the gas supply resistance will not increase.

Further, a flow limiting valve is connected in series onto a portion of the gas supplying runner that is located upstream of the solenoid valve. The arrangement of the flow limiting valve may instantly cut off the gas supplying runner when the pipeline flow is much larger than the normal working flow due to the collision of the vehicle and other conditions, so that the potential safety hazard caused by the continuous leakage of hydrogen is prevented from occurring.

Further, a filter is provided at a foremost end located upstream of the gas supplying runner in the gas flow direction, and the filter is exposed outside the valve seat. The filter is configured to filter the gas entering the high-pressure gas cylinder valve for vehicle to prevent impurities in the hydrogen gas cylinder from affecting or damaging the high-pressure gas cylinder valve for vehicle or the valve or pipeline located downstream of the high-pressure gas cylinder valve for vehicle.

In a preferred embodiment, the valve seat is further provided with a discharging runner, and a temperature pressure relief valve is connected in series onto the discharging runner. A discharging branch is led out from upstream of the temperature pressure relief valve on the discharging runner. The discharging branch is jointly connected to a downstream position of the gas supplying runner at the flow-blocking buffer structure, or the discharging branch is jointly connected to an upstream position of the gas charging runner located at the check valve, or the discharging branch is shorted to the temperature pressure relief valve. A manual discharging valve is connected in series onto the discharging branch, and an external wiring of the temperature pressure relief valve is led to the wire harness connector. Through the arrangement of the discharging runner, when the temperature of the gas cylinder exceeds a specified temperature range, the gas inside the gas cylinder may be safely discharged by turning on the temperature pressure relief valve. Further, manual discharging may be achieved through arrangement of the discharging branch communicating with the discharging runner, and different arrangement forms of the discharging branch may also meet different usage needs.

Further, a filter and a manual stop valve are sequentially connected in series onto the gas charging runner in the gas flow direction, the check valve is located downstream of the manual stop valve, and the discharging branch is jointly connected to a position of the gas charging runner between the manual stop valve and the check valve. When the hydrogen is discharged, it flows out of the high-pressure gas cylinder valve for vehicle through the filter and manual stop valve, and the discharged hydrogen is filtered for a second time to prevent impurities from affecting or damaging the valves or pipelines located downstream of the high-pressure gas cylinder valve for vehicle. The hydrogen gas is controlled for the second time by the manual stop valve, and safety is thereby improved. The same interface is used for hydrogen discharging from and entering into the high-pressure gas cylinder valve for vehicle, so the number of gas pipelines and interfaces is reduced, the costs are lowered, safety is improved, and the customized needs of different car manufacturers are met.

Further, the valve seat includes a block valve body and a cylindrical valve body extending perpendicular to a thickness direction of the block valve body. The cylindrical valve body is configured for extending into a gas cylinder, and a root portion of the cylindrical valve body has a sealing connection structure for being hermetically connected to a cylinder opening of the gas cylinder. The block valve body is located outside the cylinder opening of the gas cylinder. Each of the gas charging runner, the gas supplying runner, and the discharging runner includes a horizontal runner located in the cylindrical valve body and extending in a length direction of the cylindrical valve body and a vertical runner located in the block valve body and extending in an extension direction of the block valve body. The gas inlet of the gas charging runner, a gas outlet of the gas supplying runner, and a gas outlet of the discharging runner are formed by outer end ports of the corresponding vertical runners, respectively. The gas supplying runner is jointly connected to the gas charging runner in the block valve body, and the discharging branch is located in the block valve body. Such a structural design allows the gas charging runner, the gas supplying runner, and the discharging runner to be dispersed and extended around the cylinder opening. The valve and other structural components arranged thereon may also be dispersedly arranged around, so that the valve seat may be configured with more valve structures in a smaller volume, and the valve seat is allowed to exhibit a high degree of integration.

Further, both the manual stop valve and the manual discharging valve are installed on a side position of the block valve body in the extension direction of the block valve body. An included angle is provided between an extending direction of the manual stop valve and an extending direction of the manual discharging valve. In this way, it is easy to distinguish between the manual stop valve and the manual discharging valve, and misoperation is thereby avoided.

Further, both the temperature pressure relief valve and the solenoid valve are installed on the side position of the block valve body in the extension direction of the block valve body. The temperature pressure relief valve, the solenoid valve, the manual stop valve, and the manual discharging valve are arranged at intervals around the cylindrical valve body, and the manual stop valve and the manual discharging valve among the four valves are spaced apart from each other. Through such an arrangement, it is easy to distinguish between the manual stop valve and the manual discharging valve, and misoperation is thereby avoided.

To be more specific, the block valve body is a prismatic structure with a polygonal cross section perpendicular to the cylindrical valve body. The gas inlet of the gas charging runner extends to a first side surface of the prismatic structure. The manual stop valve and the gas outlet of the discharging runner are located on a second side surface of the prismatic structure. The first side surface and the second side surface are adjacent to and perpendicular to each other. The manual discharging valve is located on a third side surface of the prismatic structure. The second side surface is located between the first side surface and the third side surface, and the first side surface and the third side surface are parallel to and opposite to each other. The solenoid valve is located on a fourth side surface of the prismatic structure. The fourth side surface is located between the first side surface and the third side surface and is opposite to the second side surface. With such a structural layout, when the high-pressure gas cylinder valve for vehicle is installed on the gas cylinder and is being used, the gas inlet of the gas charging runner may face the horizontal direction, so that it is convenient to connect the gas cylinder to an external gas source and to charge the gas cylinder. The gas outlet of the discharging runner is vertically downwards, which is convenient to meet the safe use requirements of automobile manufacturers and national standards. The positions of the manual discharging valve and the manual stop valve are different, so that manual operation may be easily performed, and misoperation is avoided.

In addition, a filter and a manual stop valve are sequentially connected in series onto the gas charging runner in the gas flow direction, the check valve is located downstream of the manual stop valve, and the gas supplying runner is jointly connected to a position of the gas charging runner between the manual stop valve and the check valve. When the hydrogen is supplied, it flows out of the high-pressure gas cylinder valve for vehicle through the filter and manual stop valve, and the hydrogen supplied downstream of the gas cylinder valve is filtered for a second time to prevent impurities from affecting or damaging the valves or pipelines located downstream of the high-pressure gas cylinder valve for vehicle. The hydrogen gas is controlled for the second time by the manual stop valve, and safety is thereby improved. The same interface is used for hydrogen supplying and entering into the high-pressure gas cylinder valve for vehicle, so the number of gas pipelines and interfaces is reduced, the costs are lowered, safety is improved, and the customized needs of different car manufacturers are met.

DESCRIPTION OF THE EMBODIMENTS

Figure 1:
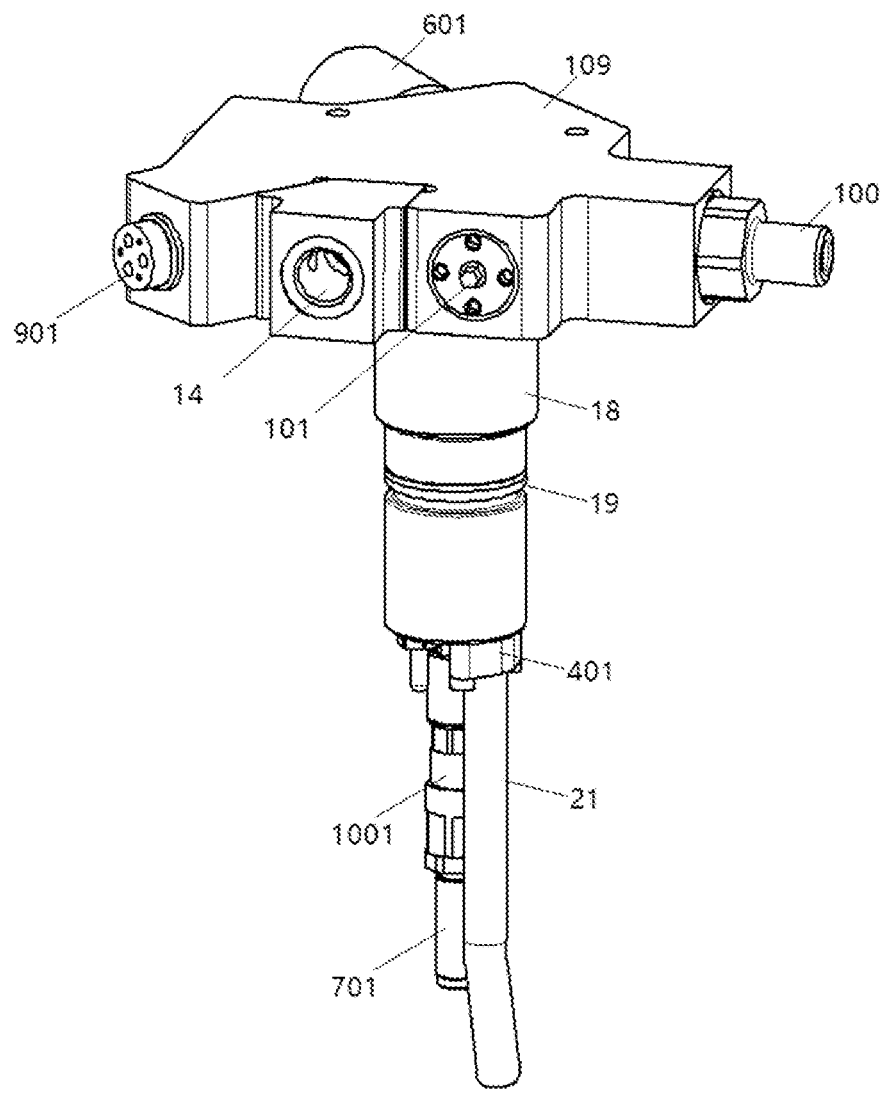
FIG. 1 is a three-dimensional view of a high-pressure gas cylinder valve for vehicle according to Embodiment one of the disclosure.
Figure 2:
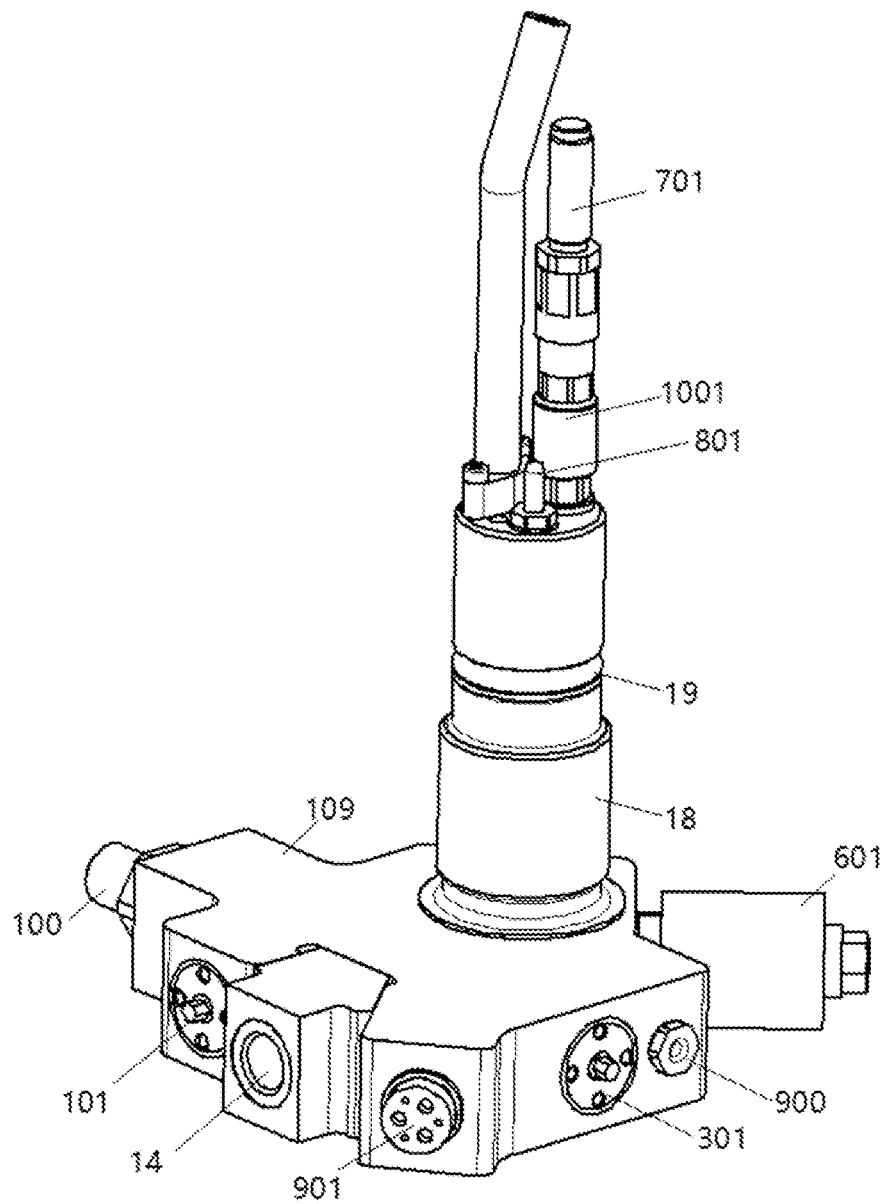
FIG. 2 is a three-dimensional view of the high-pressure gas cylinder valve for vehicle from another viewing angle according to the Embodiment one of the disclosure.
Figure 3:
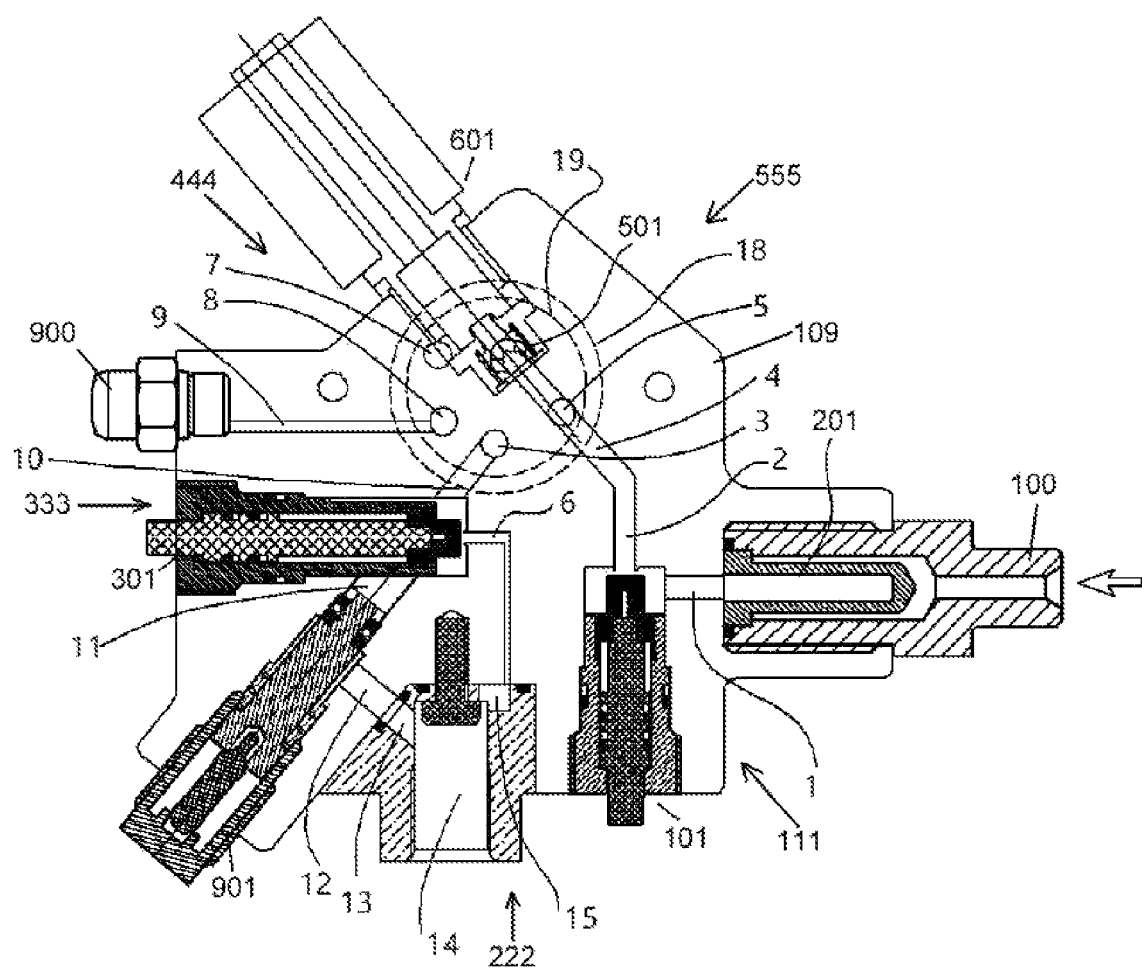
FIG. 3 is a schematic diagram of an internal structure of the high-pressure gas cylinder valve for vehicle according to Embodiment one of the disclosure.
Figure 4:
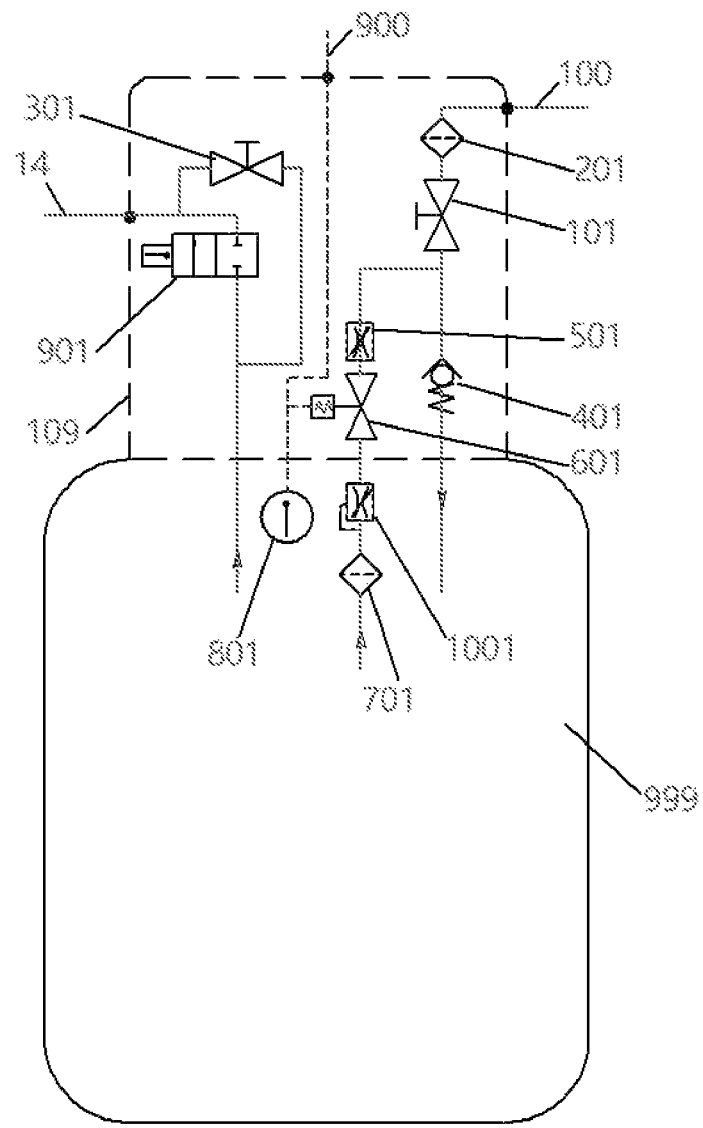
FIG. 4 is a schematic diagram of a principle of installation of the high-pressure gas cylinder valve for vehicle onto a gas cylinder according to Embodiment one of the disclosure.

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. That is, the described embodiments are merely part of the embodiments, rather than all of the embodiments, of the disclosure. The components of the embodiments of the disclosure generally described and illustrated in the drawings herein may be arranged and designed in a variety of different configurations.

Therefore, the following detailed description of the embodiments of the disclosure provided in the accompanying drawings is not intended to limit the scope of the disclosure as claimed, but is merely representative of selected embodiments of the disclosure. Based on the embodiments of the disclosure, all other embodiments obtained by a person having ordinary skill in the art without making any inventive effort fall within the scope that the disclosure seeks to protect.

It should be noted that relational terms such as "first" and "second" are only used to indicate the distinction between an entity or operation and another entity or operation, and do not necessarily require or imply any such actual relationship or order between these entities or operations. Moreover, the terms "including", "comprising", or any other variations thereof are intended to cover non-exclusive inclusion, so that a process, method, object, or device including a series of elements includes not only those elements, but also other elements that are not explicitly listed, or includes elements inherent to the process, method, object, or device. If there are no more restrictions, the element defined by the sentence "including a . . . " does not exclude the existence of other identical elements in the process, method, object, or device that includes the element.

The features and performance of the disclosure will be further described in detail below together with the embodiments.

Specific embodiment one of high-pressure gas cylinder valve for vehicle of the disclosure:

A high-pressure gas cylinder valve for vehicle provided by the disclosure is mainly used for being installed at a cylinder opening position of a gas storage cylinder, so as to charge the gas cylinder, control the gas cylinder to supply gas to gas-consuming equipment, and be safely discharged under certain circumstances. In this embodiment, the description is mainly based on an example where a high-pressure gas cylinder valve for vehicle is used on a hydrogen gas cylinder of a hydrogen energy vehicle.

To be specific, as shown in FIG. 1 to FIG. 4, the high-pressure gas cylinder valve for vehicle in this embodiment includes a valve seat. The valve seat includes a block valve body 109 and a cylindrical valve body vertically extending from a side extension surface (a side surface in a thickness direction) of the block valve body 109. A root portion of the cylindrical valve body has a threaded connection section 18, which is used for screwing and fitting with the cylinder opening of the hydrogen gas cylinder. The cylindrical valve body is further provided with a sealing assembly 19 on a side of the threaded connection section 18 facing away from the block valve body 109. When the high-pressure gas cylinder valve for vehicle is in use, the cylindrical valve body extends inwards from the cylinder opening and is hermetically connected to the cylinder opening, and the block valve body 109 is located outside the cylinder opening.

A plurality of runners are provided in the valve seat, and these runners mainly include a gas charging runner, a gas supplying runner, and a discharging runner. Further, each of these runners includes a horizontal runner located in the cylindrical valve body and extending in a length direction of the cylindrical valve body and a vertical runner located in the block valve body 109 and extending in an extension direction of the block valve body 109. Communication between the inside and outside of a gas cylinder 999 may be achieved through such runners. Certainly, these different runners are connected in series with different valve structures to achieve the control as needed.

To be more specific, the block valve body as a whole is a prismatic structure with a polygonal cross section perpendicular to the cylindrical valve body. Side surfaces of the prismatic structure may be roughly divided into five side surfaces, and the five side surfaces sequentially are a first side surface 111, a second side surface 222, a third side surface 333, a fourth side surface 444, and a fifth side surface 555 in a circumferential direction. Among these surfaces, the first side surface 111 and the second side surface 222 are adjacent to and perpendicular to each other, the second side surface 222 and the third side surface 333 are adjacent to and perpendicular to each other, the first side surface 111 and the third side surface 333 are parallel to and opposite to each other, the fourth side surface 444 and the third side surface 333 are adjacent to each other and form a convex angle, the fourth side surface 444 and the fifth side surface 555 are adjacent to each other and form a convex angle, and the fifth side surface 555 and the first side surface 111 are adjacent to each other and form a convex angle.

The vertical runners of the gas charging runner include a first runner 1, a second runner 2, and a fourth runner 4 sequentially connected in series in the gas flow direction. The first runner 1 is perpendicular to and extends to the first side surface 111, the second runner 2 and the second side surface 222 are perpendicular to each other, and the fourth runner 4 and the fourth side surface 444 are perpendicular to each other. An outer end port of the first runner 1 form a gas inlet, the first side surface 111 of the prismatic structure is provided with a gas inlet connector 100 at a position corresponding to the gas inlet, and the gas inlet connector 100 is provided with a first filter 201. On the second side surface 222 which is perpendicular to and adjacent to the first side surface 111, a manual stop valve 101 is installed. An operating end of the manual stop valve 101 is exposed on the second side surface 222. The manual stop valve 101 is connected in series at the intersection of the first runner 1 and the second runner 2 and may cut off and turn on the vertical runner. The horizontal runners of the gas charging runner include a fifth runner 5 extending to an inner end of the cylindrical valve body. The fifth runner 5 vertically communicates with a middle section of the fourth runner 4 and is arranged in a T shape with the fourth runner 4. The inner end of the cylindrical valve body is provided with a first check valve 401. The first check valve 401 is correspondingly connected to the fifth runner 5, and a gas outlet pipe 21 is connected to a downstream portion of the first check valve 401, and a pipe port of the gas outlet pipe 21 forms the gas outlet in the cylinder. In this way, when the gas cylinder 999 is charged, the gas inlet connector 100 is connected to an external gas charging source. The hydrogen gas of the gas charging source passes through a gas pipeline and the gas inlet connector 100, passes through the manual stop valve 101 and the second runner 2 along the first runner 1 after being filtered by the first filter 201, then passes through the fifth runner 5, the first check valve 401, and the gas outlet pipe 21, and enters the gas cylinder 999.

The horizontal runners of the gas supplying runner include a seventh runner 7. The seventh runner 7 extends inwards to an inner end surface of the cylindrical valve body, and a filter 701 and a first flow limiting valve 1001 are connected to the inner end surface of the cylindrical valve body. The filter 701 and the flow limiting valve 1001 are connected in series and communicate with the seventh runner 7. The filter 701 is located at the inner end of the cylindrical valve body, is screwed onto an end surface of the cylindrical valve body by a thread, and is directly exposed in the gas cylinder. The seventh runner 7 communicates with the fourth runner 4 in the block valve body 109 and is jointly connected to the gas supplying runner. A solenoid valve 601 is vertically installed on the fourth side surface 444, and the solenoid valve 601 is connected in series to the intersection of the seventh runner 7 and the fourth runner 4. A valve core of the solenoid valve 601 directly faces the fourth runner 4, and an action of the valve core of the solenoid valve 601 may be used to turn on/off the seventh runner 7 and the fourth runner 4. When the gas cylinder 999 supplies gas to a hydrogen fuel cell system through the gas supplying runner, the hydrogen gas in the gas cylinder 999 sequentially passes through the filter 701 and the first flow limiting valve 1001, flows into the seventh runner 7, and then is discharged from the vertical runners of the gas charging runner through the gas inlet connector 100 after passing through the solenoid valve 601. The solenoid valve plays a role in controlling the timing and flow of gas supply. That is, when gas supplying is performed, the gas supplying runner borrows part of the gas charging runner and the gas inlet connector 100 to supply gas to the outside, so that the gas inlet connector 100 is not only used to connect the hydrogen gas source that is charged into the gas cylinder 999, but also used to connect the gas-consuming equipment.

In the block valve body, a flow-blocking buffer structure is also connected in series on a portion of the fourth runner 4 between the fifth runner 5 and the solenoid valve 601. The flow-blocking buffer structure is mainly configured to avoid the instantaneous impact on the solenoid valve caused by the high-pressure gas charged by the high-pressure gas source during charging, so as to protect the solenoid valve. In this embodiment, the flow-blocking buffer structure is a second flow limiting valve 501. The second flow limiting valve 501 is used to limit the direct impact on the valve core of the solenoid valve 601 caused by the high-pressure gas in the gas charging runner from the runner four 4 during charging because such impact may lead to malfunction or damage of the solenoid valve 601.

The horizontal runners of the discharging runner include a third runner 3, and the third runner 3 extends to the inner end surface of the cylindrical valve body. The vertical runners of the discharging runner include a tenth runner 10, an eleventh runner 11, and a twelfth runner 12 sequentially communicating with one another in the gas flow direction. Extending directions of the tenth runner 10 and the eleventh runner 11 are the same, and the tenth runner 10 forms a specific angle with the second side surface 222 and extends obliquely away from the first side surface 111. The twelfth runner 12 is perpendicular to the extending direction of the eleventh runner 11. A discharging connector is fixedly connected to the block valve body and the second side surface 222 by a screw, and the discharging connector is provided with a vent port 14 and a thirteenth runner 13 communicating with the vent port 14. The vent port 14 may be connected to a discharging pipeline, and orientation of the vent port 14 is perpendicular to the second side surface 222. The thirteenth runner 13 corresponds to and hermetically communicates with the twelfth runner 12. A temperature pressure relief valve 901 is installed on the second side surface 222 facing the eleventh runner 11, and the temperature pressure relief valve 901 is located at the intersection of the eleventh runner 11 and the twelfth runner 12. The temperature pressure relief valve 901 may automatically turn on the eleventh runner 11 and the twelfth runner 12 when the gas cylinder 999 is outside a safe temperature range, and in this way, the discharging runner is turned on, so that the hydrogen gas in the gas cylinder 999 may be quickly discharged.

Further, the block valve body 109 is further provided with a discharging branch, and the discharging branch includes a sixth runner 6. One end of the sixth runner 6 is connected to a position of intersection of the tenth runner 10 and the eleventh runner 11, and the other end communicates with the discharging connector. In the discharging connector, the sixth runner 6 and the vent port 14 are connected through a communication channel 15, that is, the temperature pressure relief valve 901 is short-connected through the discharging branch. The third side surface 333 of the block valve body 109 is provided with a manual discharging valve 301. The manual discharging valve 301 is perpendicular to the third side surface 333 and is located at the intersection of the sixth runner 6 and the discharging runner. The manual discharging valve 301 may turn on and turn off the sixth runner 6 and the discharging runner. In this way, when the hydrogen gas in the gas cylinder 999 needs to be released during the maintenance process, the manual discharging valve 301 may be manually opened to discharge the gas in the gas cylinder 999 through the vent port 14. It should be noted that the on-off of the manual discharging valve 301 does not affect the on-off of the discharging runner.

The block valve body is further provided with a channel eight 8, and the channel eight 8 extends into the block valve body 109. The inner end of the cylindrical valve body is provided with a temperature sensor 801, and a circuit connected to the temperature sensor 801 is led into the block valve body 109 through the channel eight 8. The block valve body 109 is provided with a wire harness 9, and the wire harness 9 is led out from the third side surface 333 of the block valve body 109. A wire harness connector 900 electrically connected to the wire harness 9 is installed on the third side surface 333 for externally connecting other electronic control components. The circuit to which the temperature sensor 801 is connected, a power supply circuit and a control circuit of the solenoid valve 601 are all connected to the wire harness 9.

From the above description of the high-pressure gas cylinder valve for vehicle provided in the embodiments, it can be known that the high-pressure gas cylinder valve for vehicle provided by the disclosure exhibits a reasonable layout, a compact structure, and a high degree of integration. The flow limiting valve configured to protect the solenoid valve is arranged at a portion of the gas supplying runner communicating with the gas charging runner. In this way, when the gas cylinder is charged, the solenoid valve is prevented from being damaged due to the instantaneous impact of the high-pressure gas flow on the solenoid valve. The valve structure that is prone to failure in the entire high-pressure gas cylinder valve for vehicle is protected, so that the probability of malfunction of the high-pressure gas cylinder valve for vehicle is reduced, and the service life of the high-pressure gas cylinder valve for vehicle is prolonged.

Besides, the abovementioned high-pressure gas cylinder valve for vehicle is generally installed on the cylinder opening of a horizontally placed hydrogen gas cylinder in use. The gas inlet connector is horizontally facing a side of the vehicle body, so as to be connected to the external hydrogen gas source. The manual stop valve and the vent port face the ground, so when the hydrogen gas cylinder is safely discharged, the hydrogen may be discharged towards the ground. In this way, the safety is improved, and the national standard requirements are met. The manual discharging valve is arranged opposite to the gas inlet connector and is arranged at an angle of 90° with the manual stop valve. The manual discharging valve and the manual stop valve are separated from each other by the vent port and the temperature pressure relief valve, so that it is easy for an operator to distinguish between the two, misoperation may thus be avoided, and the safety of the high-pressure gas cylinder valve for vehicle is further improved.

Certainly, the high-pressure gas cylinder valve for vehicle provided by the disclosure is not limited to the embodiments described above. Other modified embodiments based on the design concept of the disclosure are further provided as follows.

Figure 5:
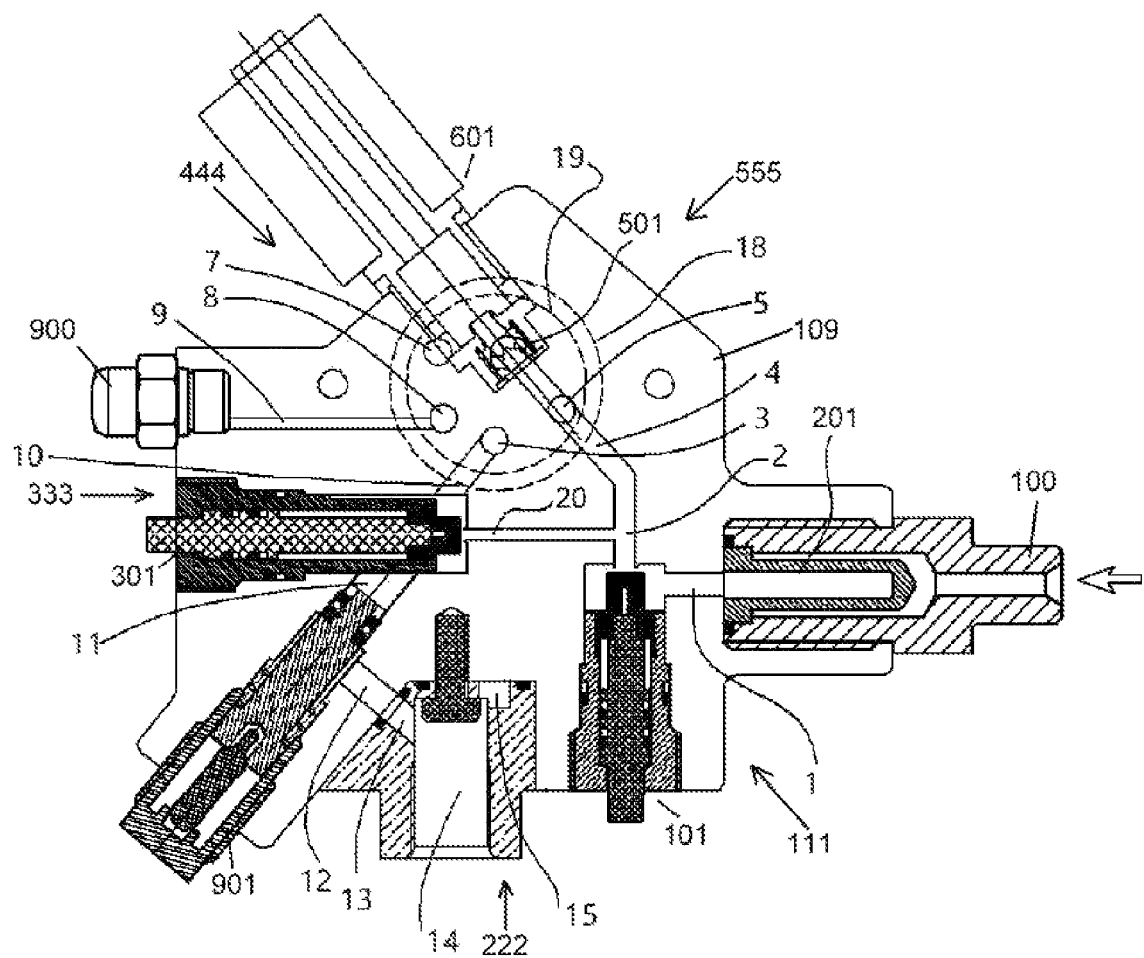
FIG. 5 is a schematic diagram of an internal structure of a high-pressure gas cylinder valve for vehicle according to Embodiment two of the disclosure.
Figure 6:
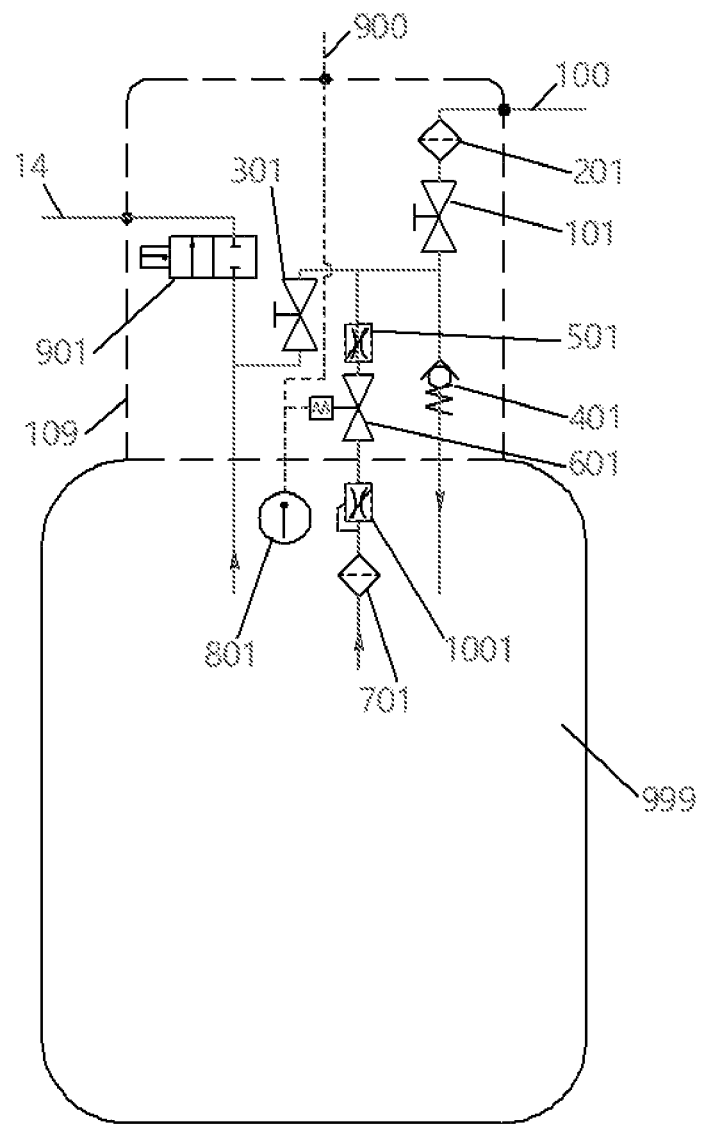
FIG. 6 is a schematic diagram of a principle of installation of the high-pressure gas cylinder valve for vehicle onto a gas cylinder according to Embodiment two of the disclosure.

A high-pressure gas cylinder valve for vehicle shown in FIG. 5 to FIG. 6 is provided in Embodiment two, and the difference between this embodiment and Embodiment one is that the discharging branch communicates with the vertical runners of the gas charging runner. To be specific, as shown in the figures, the discharging branch includes a twentieth runner 20, one end of the twentieth runner 20 is jointly connected to the communicating section of the tenth runner 10 and the eleventh runner 11, and the other end of the twentieth runner 20 communicates with the second runner 2. That is, the twentieth runner 20 is jointly connected to a portion of the gas charging runner, that is located upstream of the first check valve 401. During manual discharge, the gas in the gas cylinder flows into an upstream end of the gas charging runner through the discharging runner and the discharging branch, and then is discharged through the manual stop valve, the filter, and the gas inlet connector.

Similarly, in other embodiments, different from the description provided in Embodiment one, the discharging branch is jointly connected to the vertical runners of the gas supplying runner, and the intersection is located downstream of the second flow limiting valve, that is, the intersection is located at a position between the second flow limiting valve of the fourth runner and the fifth runner.

Alternatively, in other embodiments, different from the description provided in Embodiment one, the flow-blocking buffer structure configured to protect the solenoid valve may be a pressure reducing valve. As such, during gas charging, the pressure of the high-pressure gas acting on the solenoid valve is reduced, and the impact of the high-pressure gas is buffered.

Still alternatively, in other embodiments, different from the description provided in Embodiment one, both the manual stop valve and the manual discharging valve are arranged on the second side surface. A specific angle is provided between the manual stop valve and the manual discharging valve, so that the manual operation ends of the two valve structures are oriented differently, and thus it is easy for an operator to distinguish between the two. Certainly, the change in the position of the valve structure naturally leads to an adaptive change in the internal runners, and the change in the direction of the runners is a conventional configuration for a person having ordinary skill in the art, and description thereof thus is not provided in detail herein.

Regarding other variations, in other embodiments, different from the description provided in Embodiment one, the gas supplying runner may further be jointly connected to the gas charging runner at a position between the manual stop valve and the gas inlet connector.

Still alternatively, in other embodiments, different from the description provided in Embodiment one, the block valve body may be a pie-shaped structure or other regular polygonal prism structures or other irregular polygonal prism structures. Some or all of the manual discharging valve, the manual stop valve, and the temperature pressure relief valve are arranged onto the side surface of the block valve body facing away from the cylindrical valve body.

The above description is only preferred embodiments of the disclosure and is not intended to limit the disclosure. The scope of the patent protection of the disclosure is subject to the claims, and any equivalent structural changes made by using the content of the description and drawings of the disclosure shall be included in the protection scope of the disclosure.

What is claimed is:

1. A high-pressure gas cylinder valve for vehicle, comprising:
   a valve seat, wherein the valve seat is provided with a gas charging runner and a gas supplying runner,
   wherein a check valve is connected in series onto the gas charging runner, and a solenoid valve is connected in series onto the gas supplying runner in a gas flow direction,
   a portion of the gas supplying runner, located downstream of the solenoid valve, is jointly connected to a portion of the gas charging runner adjacent to a gas inlet end and supplies gas to outside through a gas inlet of the gas charging runner when the gas supplying runner supplies gas, the valve seat is further provided with a wire harness connector configured to be externally connected to the solenoid valve, the high-pressure gas cylinder valve for vehicle further comprises a first flow limiting valve, and the first flow limiting valve is connected in series onto the gas supplying runner, and is located downstream of the solenoid valve and upstream of an intersection of the gas supplying runner and the gas charging runner, wherein the valve seat is further provided with a discharging runner, a temperature pressure relief valve is connected in series onto the discharging runner, a discharging branch is led out from upstream of the temperature pressure relief valve on the discharging runner, and a manual discharging valve is connected in series onto the discharging branch, the discharging branch is jointly connected to a downstream position of the gas supplying runner at the first flow limiting valve, or the discharging branch is jointly connected to an upstream position of the gas charging runner located at the check valve, or the discharging branch is shorted to the temperature pressure relief valve, and an external wiring of the temperature pressure relief valve is led to the wire harness connector.

2. The high-pressure gas cylinder valve for vehicle according to claim 1, wherein a second flow limiting valve is further connected in series onto a portion of the gas supplying runner that is located upstream of the solenoid valve.

3. The high-pressure gas cylinder valve for vehicle according to claim 2, wherein a filter and a manual stop valve are sequentially connected in series onto the gas charging runner in the gas flow direction, the check valve is located downstream of the manual stop valve, and the gas supplying runner is jointly connected to the gas charging runner and is located between the manual stop valve and the check valve.

4. The high-pressure gas cylinder valve for vehicle according to claim 1, wherein a filter is provided at a foremost end located upstream of the gas supplying runner in the gas flow direction, and the filter is exposed outside the valve seat.

5. The high-pressure gas cylinder valve for vehicle according to claim 4, wherein another filter and a manual stop valve are sequentially connected in series onto the gas charging runner in the gas flow direction, the check valve is located downstream of the manual stop valve, and the gas supplying runner is jointly connected to the gas charging runner and is located between the manual stop valve and the check valve.

6. The high-pressure gas cylinder valve for vehicle according to claim 1, wherein a filter and a manual stop valve are sequentially connected in series onto the gas charging runner in the gas flow direction, the check valve is located downstream of the manual stop valve, and the discharging branch is jointly connected to a position of the gas charging runner between the manual stop valve and the check valve.

7. The high-pressure gas cylinder valve for vehicle according to claim 6, wherein the valve seat comprises a block valve body and a cylindrical valve body, the cylindrical valve body extends perpendicular to a thickness direction of the block valve body, the cylindrical valve body is configured for extending into a gas cylinder, a root portion of the cylindrical valve body has a sealing connection structure for being hermetically connected to a cylinder opening of the gas cylinder, the block valve body is located outside the cylinder opening of the gas cylinder, each of the gas charging runner, the gas supplying runner, and the discharging runner comprises a horizontal runner and a vertical runner, the horizontal runner is located in the cylindrical valve body and extends in a length direction of the cylindrical valve body, the vertical runner is located in the block valve body and extends in an extension direction of the block valve body, the gas inlet of the gas charging runner is formed by an outer end port of the vertical runner of the gas charging runner, a gas outlet of the gas supplying runner is formed by an outer end port of the vertical of the gas supplying runner, and a gas outlet of the discharging runner is formed by an outer end port of the vertical runner of the discharging runner, the gas supplying runner is jointly connected to the gas charging runner in the block valve body, and the discharging branch is located in the block valve body.

8. The high-pressure gas cylinder valve for vehicle according to claim 7, wherein both the manual stop valve and the manual discharging valve are installed on a side position of the block valve body in the extension direction of the block valve body, and an included angle is provided between an extending direction of the manual stop valve and an extending direction of the manual discharging valve.

9. The high-pressure gas cylinder valve for vehicle according to claim 8, wherein both the temperature pressure relief valve and the solenoid valve are installed on the side position of the block valve body in the extension direction of the block valve body, the temperature pressure relief valve, the solenoid valve, the manual stop valve, and the manual discharging valve are arranged at intervals around the cylindrical valve body, and the manual stop valve and the manual discharging valve among the temperature pressure relief valve, the solenoid valve, the manual stop valve and the manual discharging valve are spaced apart from each other.

10. The high-pressure gas cylinder valve for vehicle according to claim 9, wherein the block valve body is a prismatic structure perpendicular to the cylindrical valve body and having a polygonal cross section, the gas inlet of the gas charging runner extends to a first side surface of the prismatic structure, the manual stop valve and the gas outlet of the discharging runner are located on a second side surface of the prismatic structure, the first side surface and the second side surface are adjacent to and perpendicular to each other, the manual discharging valve is located on a third side surface of the prismatic structure, the second side surface is located between the first side surface and the third side surface, and the first side surface and the third side surface are parallel to and opposite to each other, the solenoid valve is located on a fourth side surface of the prismatic structure, and the fourth side surface is located between the first side surface and the third side surface and is opposite to the second side surface.

11. The high-pressure gas cylinder valve for vehicle according to claim 1, wherein a filter and a manual stop valve are sequentially connected in series onto the gas charging runner in the gas flow direction, the check valve is located downstream of the manual stop valve, and the gas supplying runner is jointly connected to the gas charging runner and is located between the manual stop valve and the check valve.

* * * * *